Figure 1:
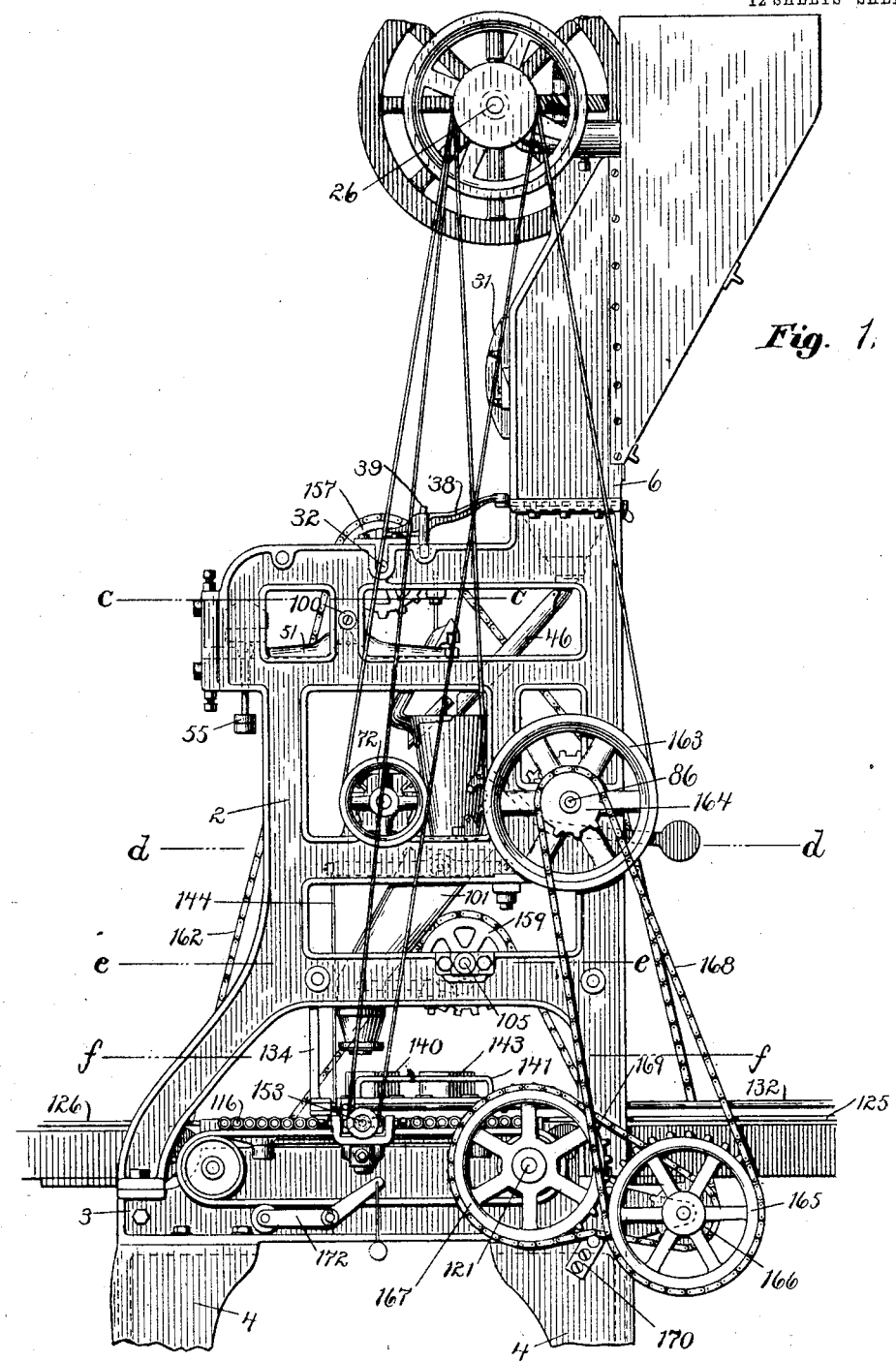

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.

12 SHEETS—SHEET 1.

Witnesses:
Walter E. Lombard
Arthur T. Randall

Inventor:
W. E. Nickerson,
by E. D. Chadwick,
Attorney.

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.

12 SHEETS—SHEET 2.

Witnesses:
Walter E. Lombard
Arthur F. Randall

Inventor:
W. E. Nickerson
by E. D. Chadwick.
Attorney.

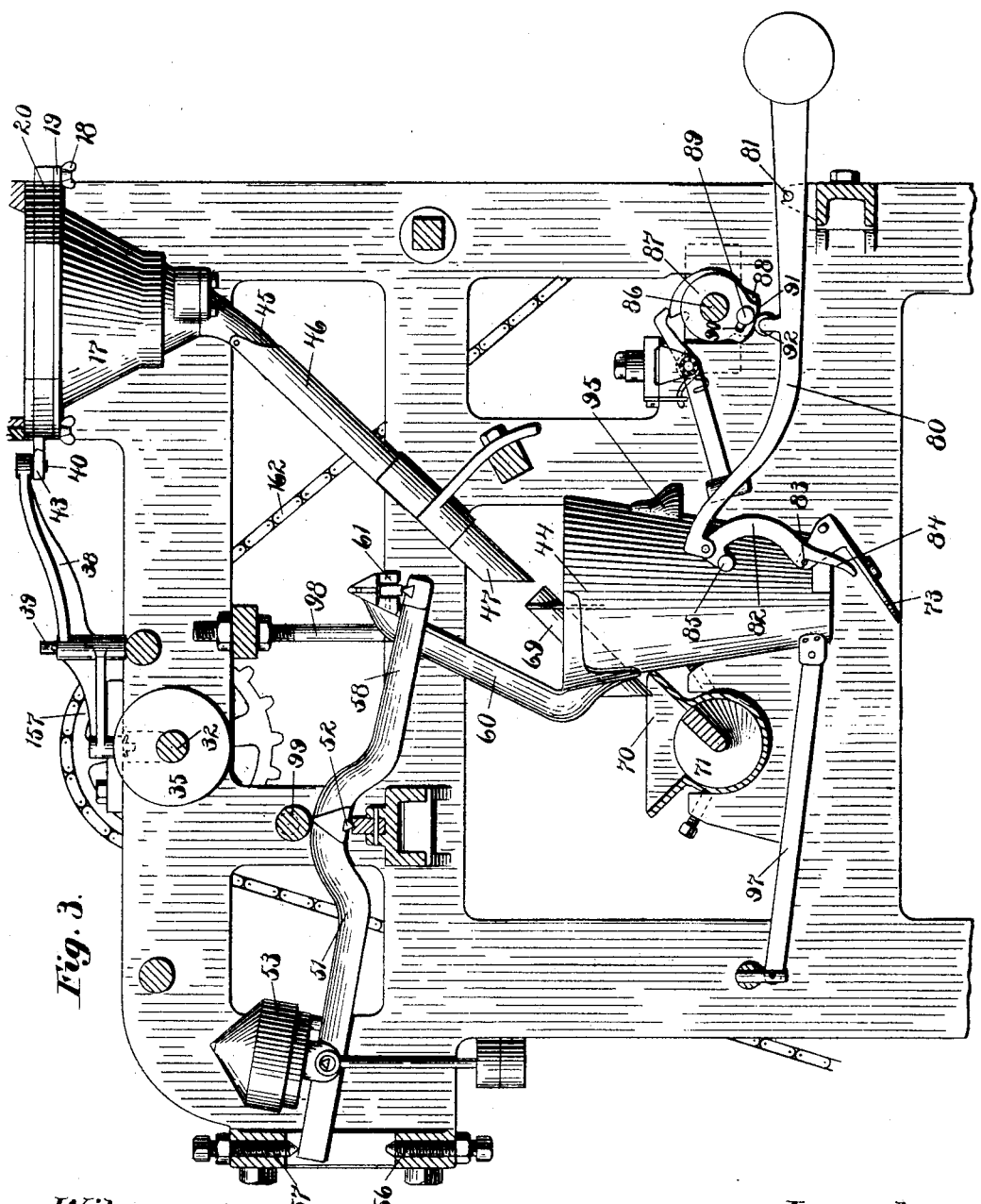

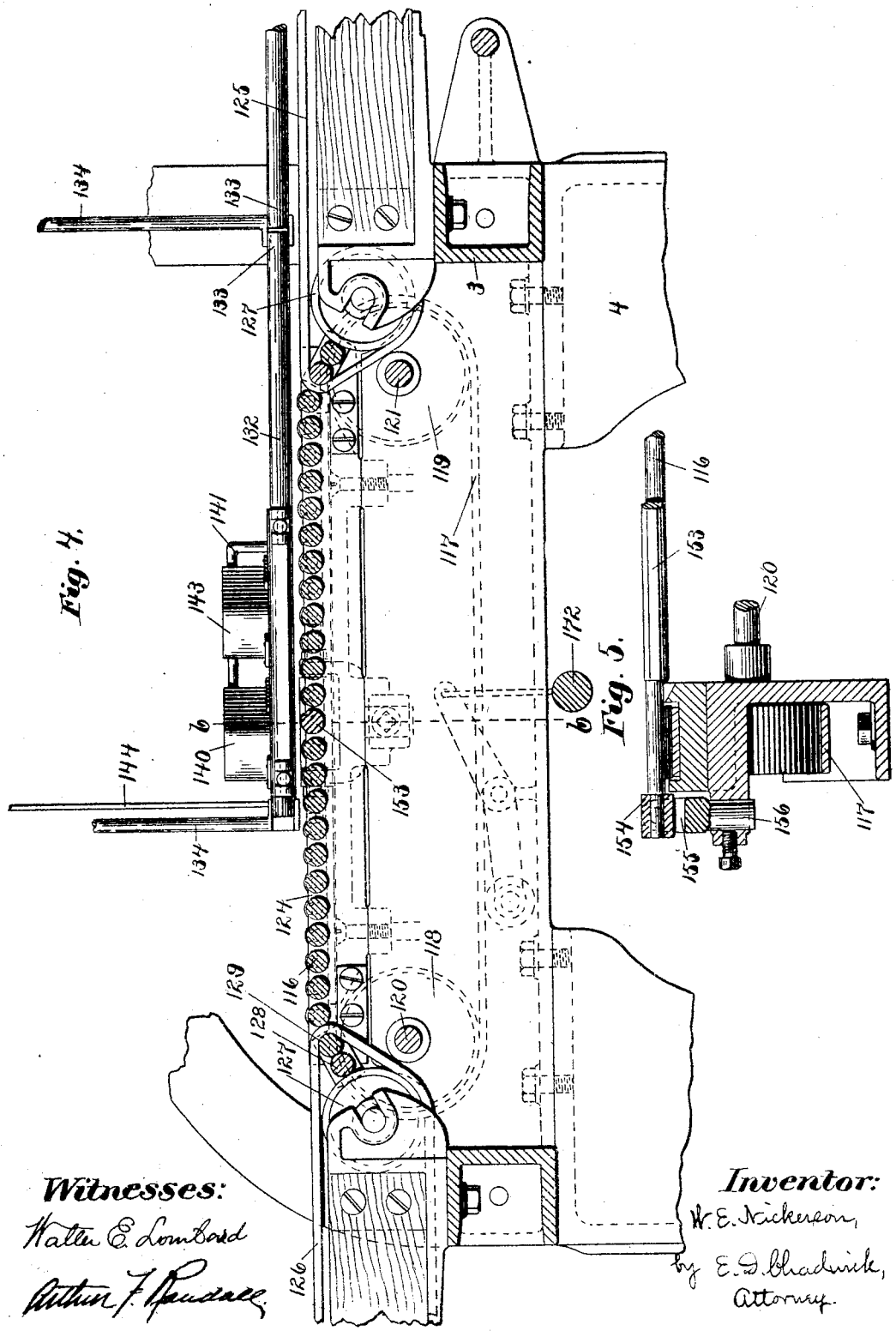

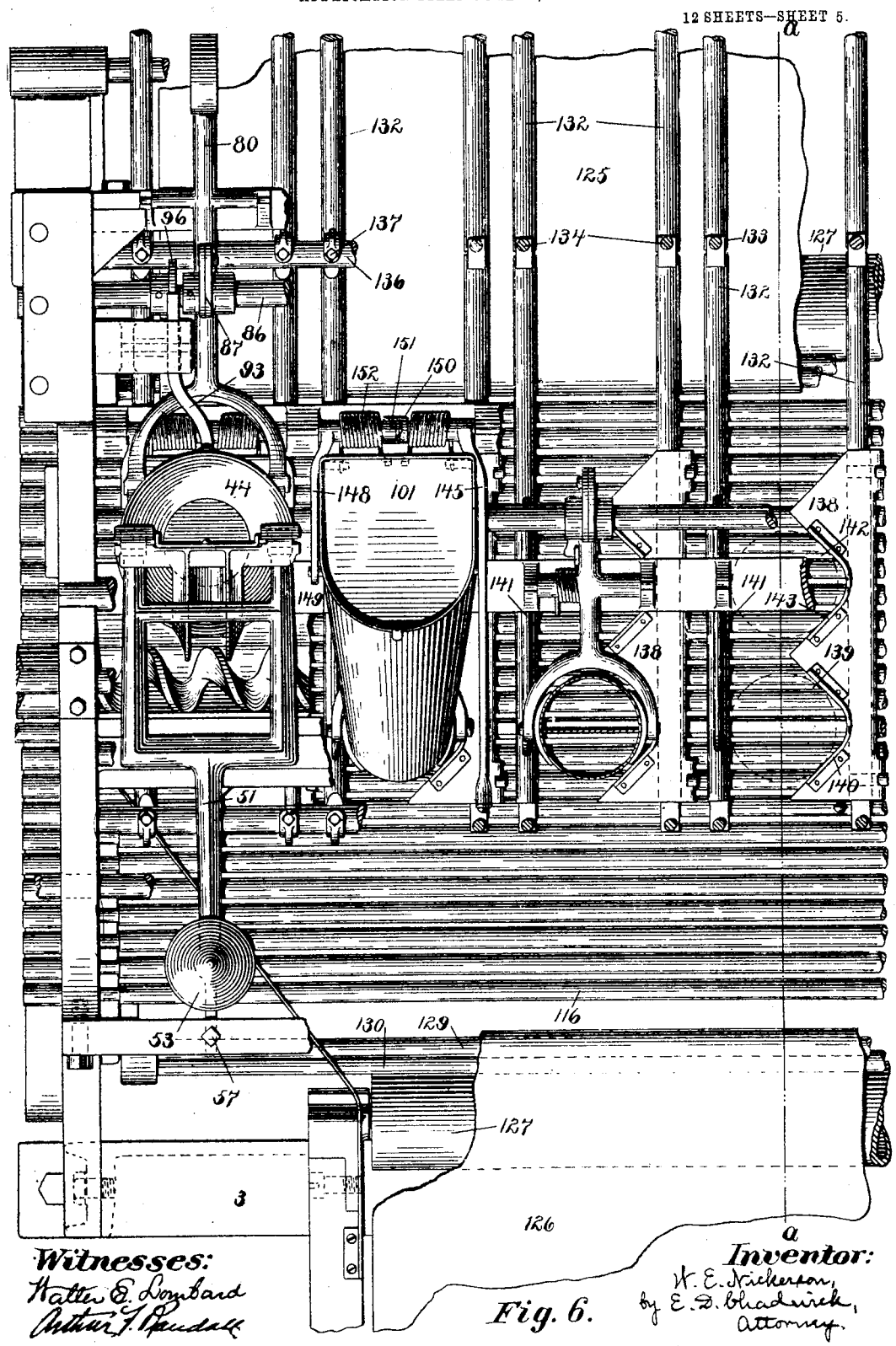

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.

12 SHEETS—SHEET 7.

Witnesses:
Walter E. Lombard.
Arthur F. Randall.

Inventor:
W. E. Nickerson,
by E. D. Chadwick,
Attorney.

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.
12 SHEETS—SHEET 8.
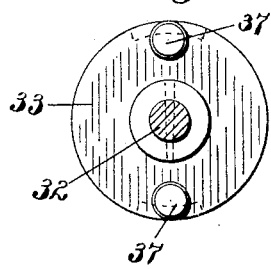
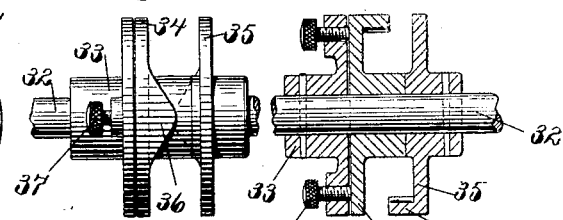
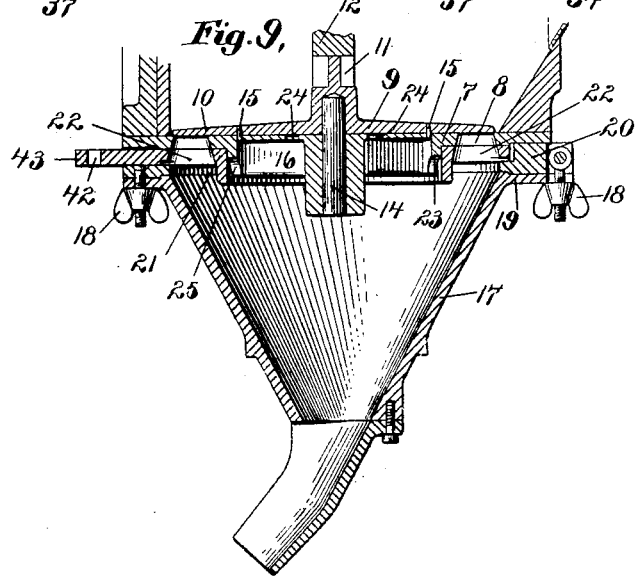
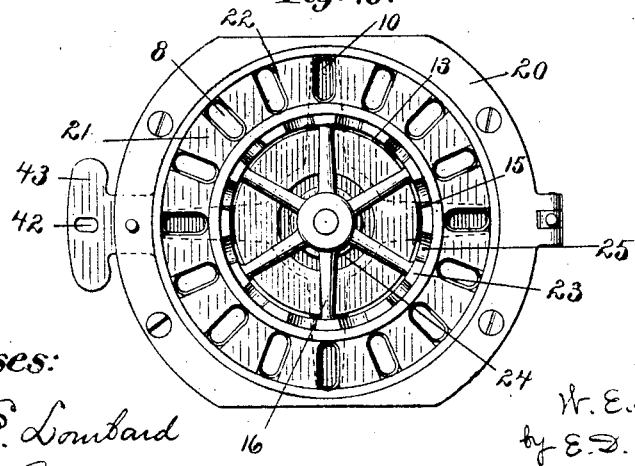
Witnesses:
Walter E. Lombard
Arthur J. Randall
Inventor:
W. E. Nickerson,
by E. D. Chadwick,
Attorney.

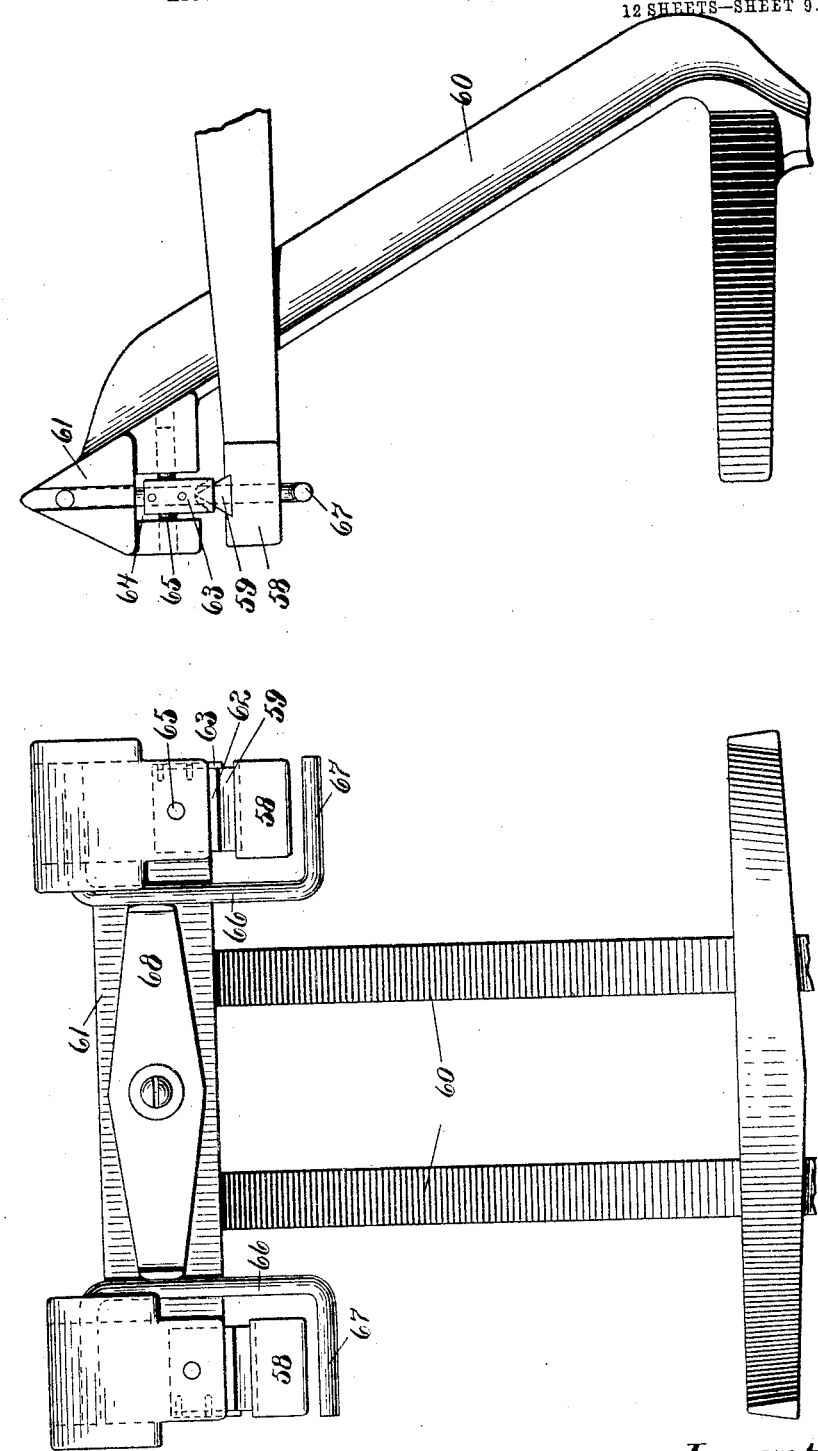

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.
12 SHEETS—SHEET 10.
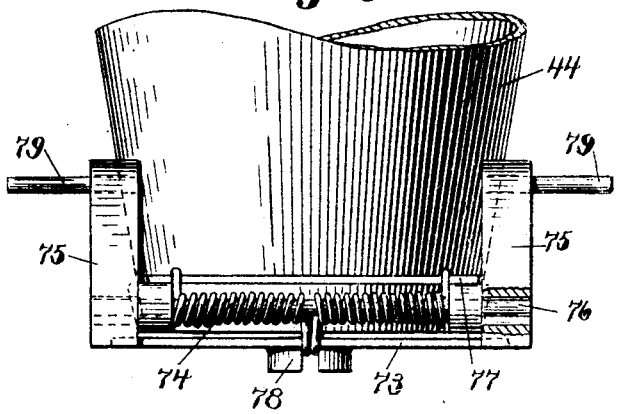
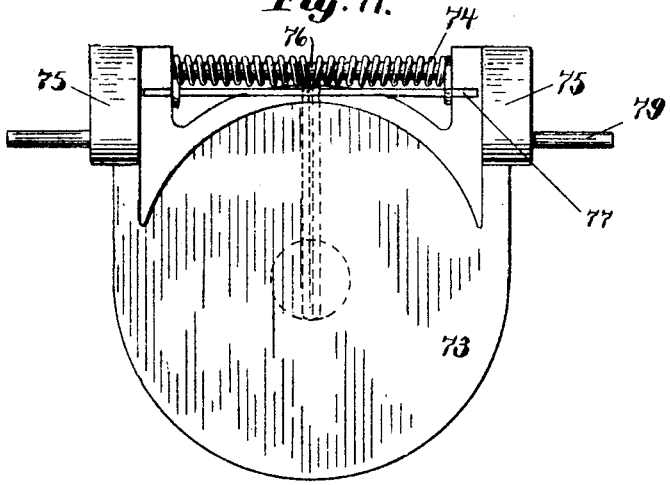
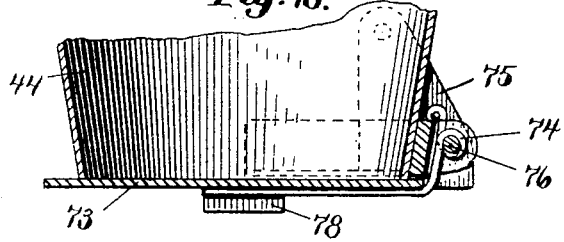
Witnesses:
Walter E. Lombard
Arthur F. Randall
Inventor:
W. E. Nickerson,
by E. D. Chadwick,
Attorney.

No. 797,597. PATENTED AUG. 22, 1905.
W. E. NICKERSON.
AUTOMATIC WEIGHING AND PACKAGE FILLING APPARATUS.
APPLICATION FILED JUNE 11, 1902.
12 SHEETS—SHEET 12.
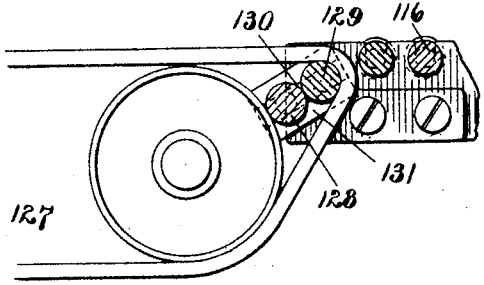
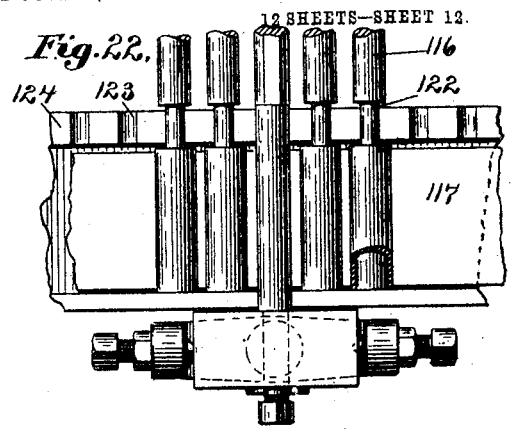
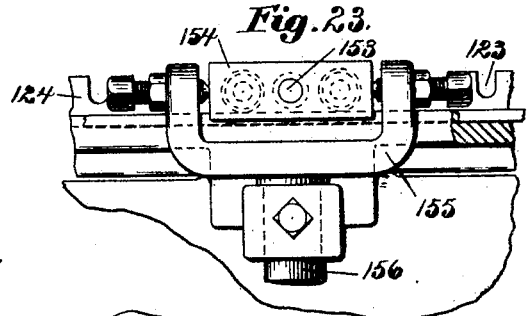
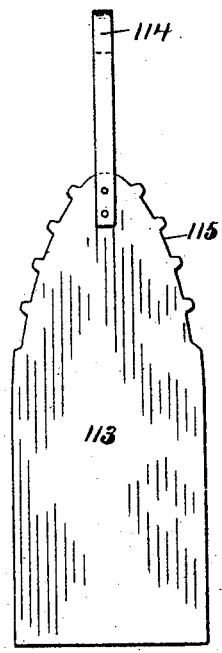
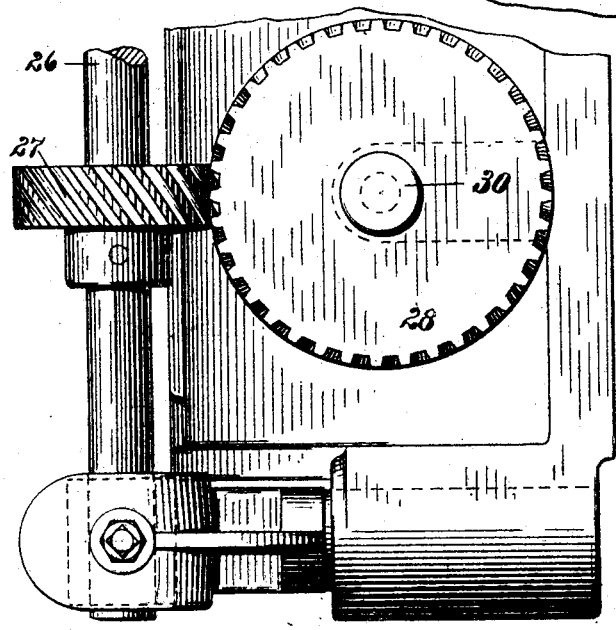
Witnesses:
Walter E. Lombard
Arthur F. Randall
Inventor:
W. E. Nickerson,
by E. D. Chadwick,
attorney

UNITED STATES PATENT OFFICE.

WILLIAM EMERY NICKERSON, OF CAMBRIDGE, MASSACHUSETTS, ASSIGNOR TO AUTOMATIC WEIGHING MACHINE COMPANY, OF NEW YORK, N. Y., A CORPORATION OF NEW YORK.

AUTOMATIC WEIGHING AND PACKAGE-FILLING APPARATUS.

No. 797,597.     Specification of Letters Patent.     Patented Aug. 22, 1905.

Application filed June 11, 1902. Serial No. 111,115.

*To all whom it may concern:*

Be it known that I, WILLIAM EMERY NICKERSON, a citizen of the United States, and a resident of Cambridge, in the county of Middlesex and State of Massachusetts, have invented certain new and useful Improvements in Automatic Weighing and Package - Filling Apparatus, of which the following is a specification.

My invention relates to automatic weighing apparatus, and is intended more particularly to provide a machine capable of weighing powdery substances—such as baking-powder, starch, and the like—with greater rapidity and accuracy, especially when the quantities desired are small, than have heretofore been attained.

A further object of my invention is to produce an apparatus adapted to receive in bulk the substance to be weighed, to weigh out automatically the desired quantities thereof, to introduce and pack the loads weighed into the receptacles provided therefor, and to deliver the filled receptacles, the organization of the apparatus being such that the filling and delivery of the receptacles may be accomplished without making it necessary to employ for that purpose a separate device, such as a rotating table arranged to present the empty receptacles successively to the weighing-machine proper and to withdraw the same therefrom when filled, as has been customary hitherto.

With the above ends in view a main feature of my invention is the provision of certain improvements in the weighing mechanism proper, whereby the scale-beam and weighing - bucket are freed completely from all functions and mechanical connections which might reduce the sensitiveness of the scale-beam by retarding or interfering with its tilting, such as flow-controlling and bucket-dumping connections, which in one form or another have always been employed hitherto, so far as I am aware, and have prevented the weighing automatically with sufficient accuracy for commercial purposes of quantities of material below a certain limit of smallness. Another feature of my invention is the provision of a series or "gang" of weighing mechanisms proper arranged to deliver into a corresponding series of receptacles held in place by a common support, which also serves to convey the receptacles through the machine and to permit the settling of the material therein, the operation of the various parts of the apparatus being so timed that each receptacle will remain under the proper weighing mechanism long enough to receive a load therefrom and to have said load sufficiently settled or shaken down within it, while the apparatus as a whole will receive empty receptacles and fill and deliver the same with sufficient speed to require the whole time of an attendant in supplying empty receptacles and disposing of the filled ones.

Other features of my invention reside in a novel device for conveying the receptacles through the machine, for supporting them while being filled, and for settling the loads therein, which features, together with others of a subordinate nature, will be hereinafter set forth at length.

An apparatus embodying a preferred form of my improvements is illustrated in the accompanying drawings, in which—

Figure 2:
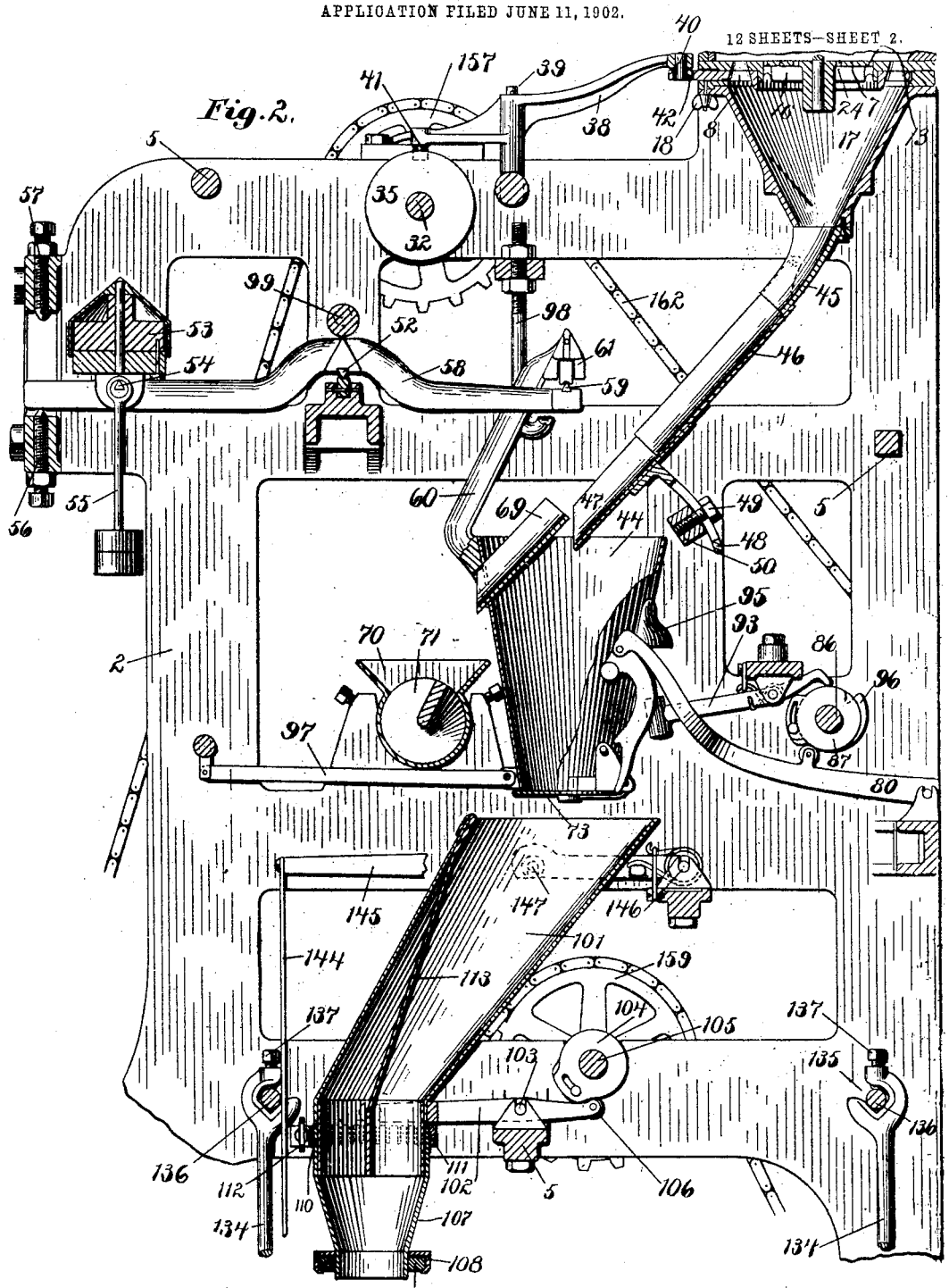
Figure 7:
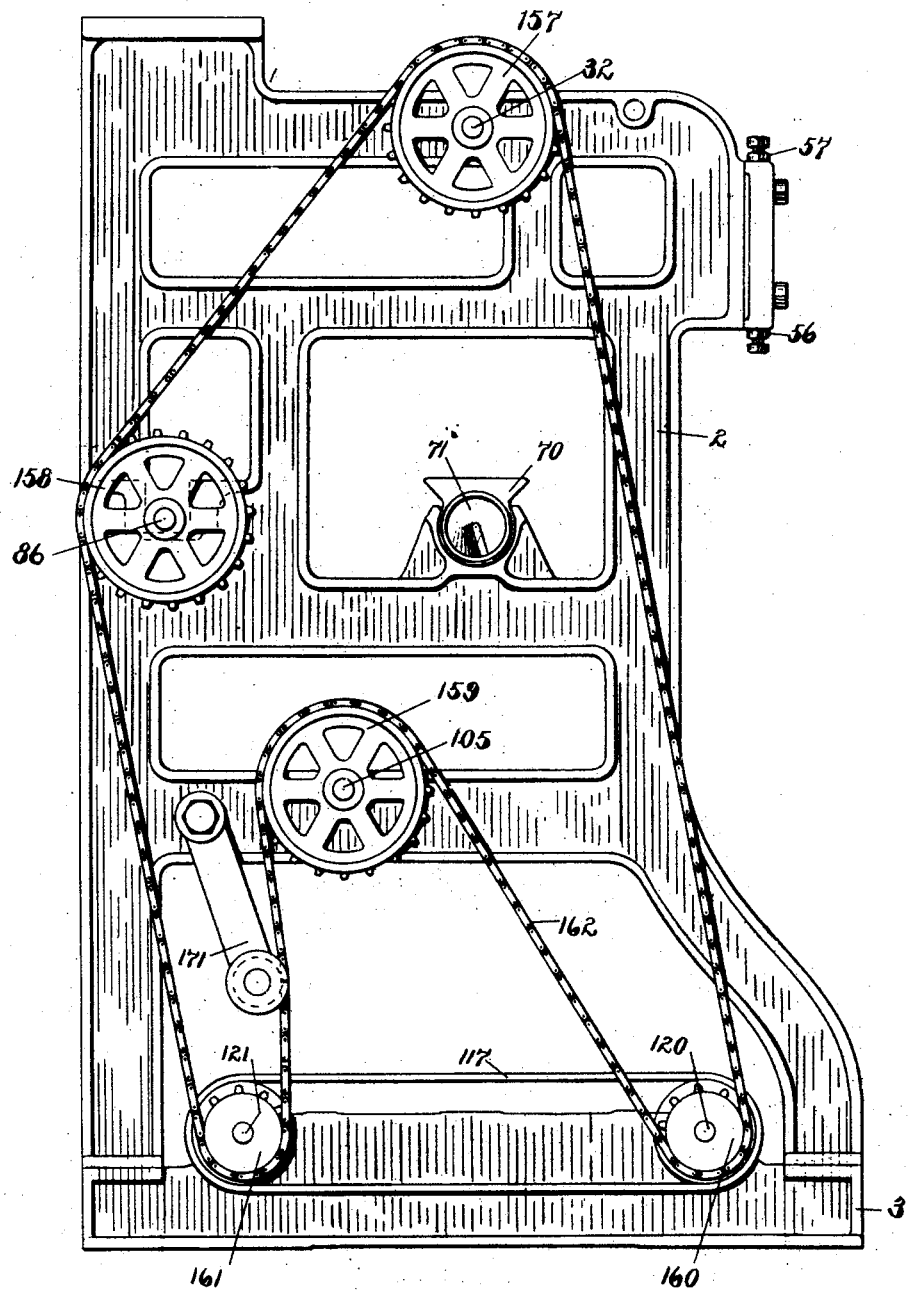
Figures 8, 26:
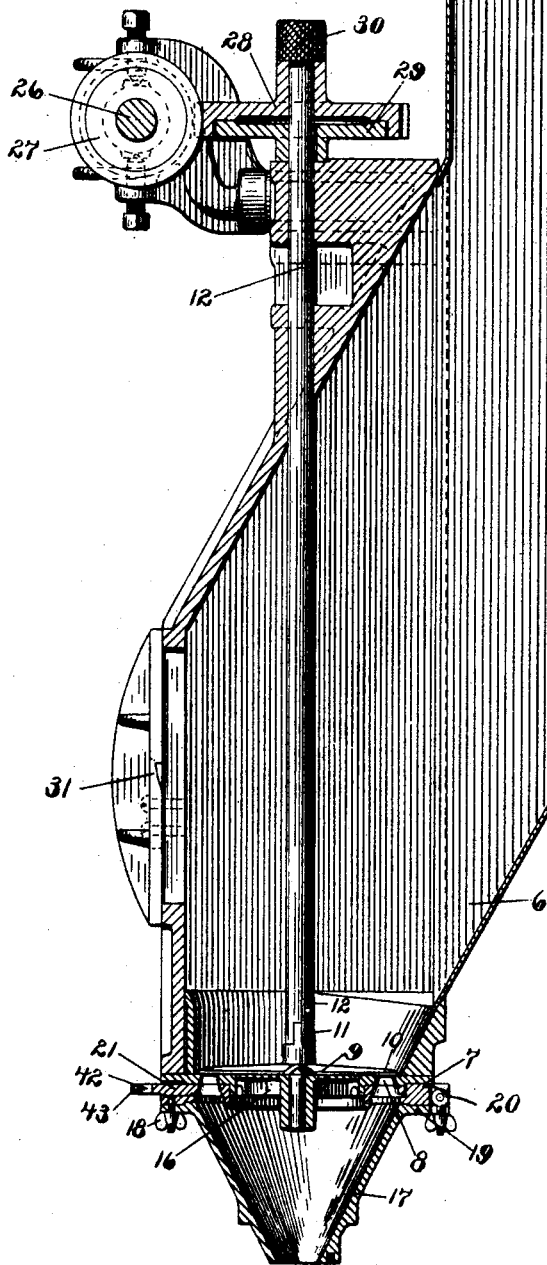
Figure 19:
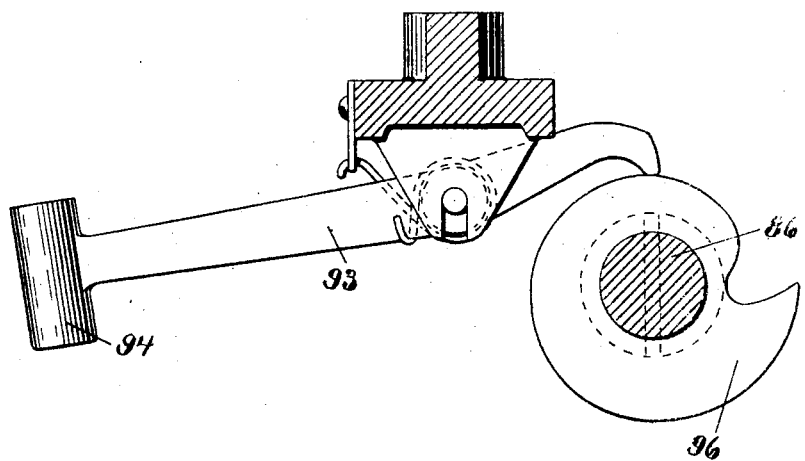
Figure 20:
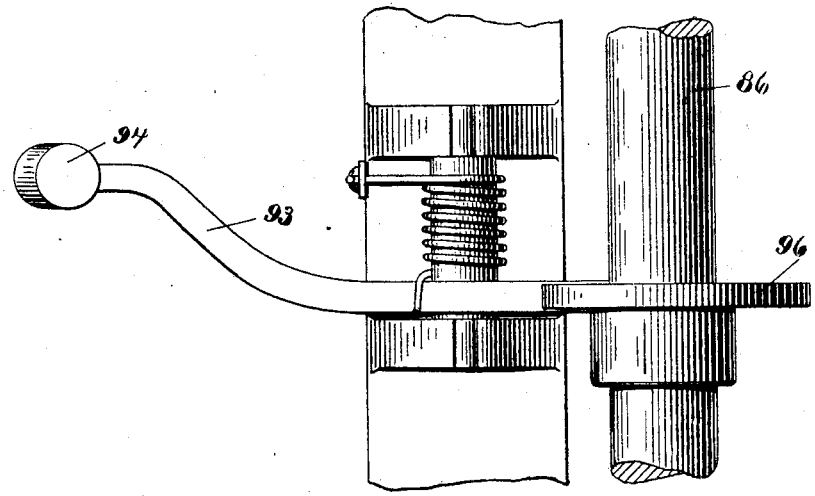

Figure 1 is a side elevation of the complete apparatus looking at the right-hand end thereof. Fig. 2 is a vertical section through one of the weighing mechanisms proper, showing also the lower portion of a feeding device and a chute for conveying the material from the weighing-bucket to a receptacle, together with adjacent connecting and operating parts. Fig. 3 is a view similar to Fig. 2, but showing the parts of the weighing mechanism proper in side elevation, the delivery-chute below the same being omitted. Fig. 4 is a vertical section through a receptacle supporting and conveying device, taken on the line $a\,a$ in Fig. 6. Fig. 5 is a detail sectional view taken on the line $b\,b$ in Fig. 4. Fig. 6 is a plan view of a portion of the apparatus taken on four different planes and showing four separate weighing and delivery mechanisms, the planes on which said mechanisms are shown, taking them in order from left to right, being indicated in Fig. 1 by the lines $c\,c$, $d\,d$, $e\,e$, and $f\,f$, respectively. Fig. 7 is an elevation of the left-hand end of the framework of the central portion of the machine, showing the arrangement by which the various parts of the apparatus are driven. Fig. 8 is a central vertical section of the feeding mechanism shown in side elevation in Fig. 1. Fig. 9 is a vertical section, somewhat enlarged, of the lower part of the feeding device shown in Fig. 8, showing also a flow-controlling device. Fig. 10 is a bottom plan view of the parts shown in Fig. 9 with the funnel removed. Figs. 11, 12, and 13 are respectively an end elevation, a side elevation, and a central section of an adjustable cam which may be employed for operating said flow-controlling device. Figs. 14 and 15 are enlarged detail views, in front and side elevation, respectively, showing my preferred construction for supporting a weighing-bucket from its scale-beam. Figs. 16, 17, and 18 are respectively a rear elevation, a plan view, and a central vertical section of the lower portion of a weighing-bucket, showing the bucket-closer and its connections. Figs. 19 and 20 are respectively a side elevation and a plan view of a rapping device hereinafter described. Fig. 21 is a detail view illustrating the manner in which one end of a conveying-belt is brought close to the conveying-support hereinafter described. Fig. 22 is a plan view illustrating a portion of one end of said conveying-support and of a settling device hereinafter described. Fig. 23 is an end elevation of the parts shown in Fig. 22. Fig. 24 is an elevation of a partition located in the delivery-chute shown in Fig. 2. Fig. 25 is a plan view showing the arrangement of gearing which I prefer to employ for driving the feeding mechanism, and Fig. 26 is a similar view, on a smaller scale, illustrating more fully the arrangement of this gearing.

My apparatus is of the power-driven type and comprises, complete, a bin or hopper adapted to receive in bulk a quantity of the material to be weighed; a feeding device for delivering material from the bin to the weighing-bucket or buckets; a flow-controlling device for regulating the delivery of material; one or more scale-beams, each provided with a weighing-bucket and a suitable weight; means for dumping the weighing-bucket or buckets; a chute for conveying each load from the weighing-bucket to a receptacle; a supporting and conveying device arranged to receive empty receptacles from a conveying belt or apron to position the same at the proper intervals beneath a delivery-chute and to deliver the filled receptacles to a second conveying belt or apron adapted to transport them to any desired point, and a device for shaking down or settling each load as fast as it is delivered into its receptacle, in combination with mechanisms suitable for effecting the operation of the various parts of the apparatus at the proper times and in the proper manner.

The framework of the apparatus shown comprises two upright end portions 2, supported on a base 3, provided with legs 4 and connected and braced apart by suitable cross-rods 5 and the like at a sufficient distance to accommodate between them a number of weighing mechanisms arranged side by side. To the top of the end portions 2 is secured a bin or receptacle 6, extending from one end of the machine to the other. This bin is adapted to receive a considerable quantity of material in bulk and is provided at its bottom with one or more discharge-openings, according to the number of weighing mechanisms employed. The machine shown in the drawings has six of such weighing mechanisms, and accordingly the bin 6 will have six discharge-openings, each of which is preferably provided with a flow-controlling device and also in cases where the nature of the substance weighed requires it with a feeding device adapted to assist in the delivery of material through the opening. To construct the feeding mechanism herein shown, (see Figs. 8, 9, and 10,) the plate 7, forming the bottom of the bin 6, is provided at each point where a discharge-opening is desired with a number of perforations 8, preferably arranged in a circle, and a flat spider 9, having a number of radial arms 10, is journaled to rotate on the top of said plate, as shown in Figs. 8 and 9, and is secured, preferably by interlocking fingers 11, to a vertical shaft 12, passing upward out of the bin 6 and there provided with means for rotating it, so that upon the rotation of said shaft the radial arms 10 will be moved successively around the circumference of the fixed plate 7 and will serve to agitate the adjacent material and to feed portions of the same through the openings 8. I prefer to make said openings 8 of sufficient size to permit the rapid delivery of an approximate load of material and to provide in addition thereto another opening or series of openings adapted to deliver a small or drip stream of material, the latter opening being shown at 13 in Fig. 10 and consisting, preferably, of a narrow slit cut through the plate 7 on a circle described from the central axis 14, on which the spider 9 is journaled. As thus constructed the arms 10 of the spider 9 will act to feed material through the slit 13 in the manner above described, and in order to keep said slit from clogging with material a pin or tooth 15 may be secured to the under side of each arm 10, with its lower end projecting into the slit and acting to clear the same from material at each rotation thereof. It will be noticed that those portions of the plate 7 which lie on opposite sides of the circular slit 13 are united and kept integral by radial ribs 16, formed on the bottom of said plate, said slit being cut deep enough to penetrate said plate between the ribs, but not deep enough to reach the bottom of said ribs. The features just described are not claimed herein broadly, but only in combination with certain other features, as hereinafter set forth, the construction referred to being broadly claimed in another application for Letters Patent, filed by me on the 8th day of February, 1898, Serial No. 669,499, and issued as Patent No. 706,588, dated August 12, 1902.

The portions of material which fall through the perforations 8 are received by a suitable conveying device, such as a funnel 17, secured to the bottom of the bin 6, preferably by being clamped, by means of removable thumb-nuts 18 bearing against a flange 19, formed on said funnel, to a ring 20, rigidly fastened to the plate 7, so that the funnel may readily be removed to give access to the feeding device above described. To control the flow of material through the feeding device, I prefer to employ an oscillating plate 21, closely held between the plate 7 and the ring 20, the latter being suitably recessed to receive said plate 21, which is journaled concentrically with the spider 9 and is provided with apertures 22, adapted to register with the perforations 8 in the plate 7, so that by moving the plate 21 in one direction the apertures 8 and 22 will be made to register, and thereby to permit a flow of material through the same, while by moving it in the other direction the unperforated portions of the plate 21 will be made to close said apertures, and thus to cut off the flow of material through the same.

My preferred form of weighing mechanism is so constructed as to make it unnecessary to cut off the drip stream of material upon the completion of a load, because in weighing baking-powder and similar materials it is found that if the flow of a fine stream of material is cut off it is apt to be slow and irregular in starting again on account of the clogging and compacting of the material at and near the point of delivery by the pressure of the mass above it. Accordingly I have shown the oscillating plate 21 as journaled on a circular flange 23, projecting downward from the bottom of the plate 7 outside of the slit 13 and at the outer ends of the ribs 16, said oscillating plate being thus provided with a central opening, through which the drip stream of material will fall continuously. The circular slot 24, cut through the plate 7 near its center, is for the purpose of permitting any material which may find its way in between the spider 9 and the top of said plate to fall into the funnel 17, the feeding device being thus made self-cleaning and prevented from clogging with material, and the notches 25, cut in the bottom edge of the flange 23, serve in a similar manner to keep the bearing-surface between said flange and the plate 21 free from material. The perforations 8 and 22 are preferably so formed that when coincident the diameter of each of the openings thereby provided increases slightly in passing from the top to the bottom thereof, the object being to facilitate the passage of the material through these openings, and thus to prevent their becoming clogged therewith. The slot 24, it will be noted, is covered at all times by the central portion of the spider 9, and hence has no effect on the feeding of the material to the funnel 17.

Suitable mechanism is provided for driving the vertical shafts 12 continuously, preferably consisting of a horizontal shaft 26, journaled at its ends near the top of the machine and driven from any suitable source of power, driving connections between the shafts 26 and 12 being furnished, preferably, by means of pairs of intermeshing spiral gears 27 and 28, secured to said shafts, respectively, and shown in detail in Fig. 25. I prefer to connect each spiral gear 28 with its shaft 12 by means of a species of friction-clutch, such as a collar 29, secured to said shaft and clamped against said gear by means of a clamping-screw 30, entering the end of the shaft 12 and bearing upon the top of said gear, the thread of said screw being cut in such a direction that in case the rotation of any one of the shafts 12 is obstructed in any manner the effect of the continued rotation of the corresponding gear 28 will be to unscrew its clamp-screw 30, and thus to relieve the friction-clutch from pressure and allow said gear to slip on the collar 29. In this manner the stopping of any one or more of the shafts 12 is prevented from interrupting the rotation of the shaft 26 and of the other shafts 12 with their feeding devices. In order to relieve the shaft 26 from the effect of the end thrust which each gear 27 tends to give it, I prefer to cut the gears so as to cause half of the shafts 12 to rotate in one direction and the other half in the opposite direction, so that the end thrust on the shaft 26 caused by each pair of gears 27 and 28 will be balanced by an equal thrust caused by another pair of said gears. This arrangement is indicated in Fig. 26, in which the end gears only are shown, it being understood that each two pairs of the remaining gears are similarly arranged.

An important feature of the above-described arrangement of the shafts 12 and 26 is that the latter shaft being journaled at its ends only which are at the sides of the machine does not have to be lubricated at any point from which the oil could possibly fall into the material weighed, thus insuring cleanness as well as efficiency. The bin 6 is preferably provided with a removable door 31, through which access may be had to the interior of said bin above the feeding devices.

For operating the oscillating plates 21 I provide a horizontal shaft 32, extending across the machine and journaled in the end portions 2, said shaft being rotated continuously by suitable connections, such as hereinafter described. Opposite each plate 21 said shaft is provided with an adjustable cam of peculiar construction. (Best shown in Figs. 11, 12, and 13.) As therein shown, said cam consists of three collars 33, 34, and 35, the collars 33 and 35 being fixed to the shaft 32. The collars 34 and 35 are provided, respectively, with projections 36 and 36ª, each extending laterally from the circumference of its collar toward the other collar and forming a cam-face, and the collar 34 is made adjustable circumferentially with respect to the collar 35, preferably by providing the fixed collar 33 with two diametrically opposite set-screws 37, adapted to bear against the collar 34 and force its hub against the collar 35, and thereby clamp the former in any position to which it may be adjusted. Opposite each of these cams an arm 38 is journaled to oscillate horizontally on a fixed pivot 39 and is provided at its ends with pivots or pins 40 and 41, the former projecting into a slot 42, formed in a lateral extension 43 of the corresponding oscillating plate 21 and the other pin 41 being located between the collars 34 and 35 in position to be acted upon successively by the cam-faces formed by the projections 36 and 36ª as the shaft 32 rotates. As thus constructed upon the rotation of said shaft the projection 36 or 36ª on one of the collars 34 and 35 will engage the pin 41 on the arm 38 and will oscillate said arm, and with it the plate 21, to shut off the flow of material through the same. Said plate, arm, and pin will then remain in the positions to which they have been moved until the projection on the other collar engages said pin and moves it back again to its former position, whereupon the flow-controlling device will be opened and will remain open until during the next rotation of the shaft 32 the arm 38 is again oscillated to cut off the flow, and it will be seen that by adjusting the collar 34 circumferentially with respect to the collar 35 the closing of the flow-controlling device may be made to occur as soon after the opening thereof as may be desired, so that the period of delivery of the bulk stream of material may thereby be regulated with accuracy. The material fed into each funnel 17 falls therefrom into a corresponding weighing-bucket 44, being transmitted thereto along an inclined chute, the angle of which is made adjustable in any suitable manner, preferably by constructing the chute in three parts 45, 46, and 47, of which the part 45 is rigidly secured to the open bottom of the funnel 17. The part 46 is pivoted at its upper end to the sides of the part 45 and rests at its lower end within the top of the part 47, and the latter is adjustably supported by means, such as a slotted arm 48, rigidly secured thereto and arranged to be clamped in any desired position by a bolt 49, passing through the slot in the arm 48 into a fixed rod or other support 50, forming a part of the framework of the machine, the arm 48 being curved substantially on the arc of a circle of which the lower end of the part 47 is the center, so that said lower end will remain in practically the same position regardless of the angle to which the part 47 may be adjusted.

Each bucket 44 is suspended from one end of a scale-beam 51, mounted on knife-edges 52 in any suitable manner and carrying at its other end a weighing-weight 53. This weighing-weight 53 is preferably located on the top side of the beam 51, so that said beam will overbalance when it is tilted by the filling of the bucket, or, in other words, so that the beam will be in unstable equilibrium when in a horizontal position, the object of this arrangement being to cause the downward movement of the bucket 44 to accelerate when the beam tilts in order that the supply of material may be cut from the bucket as quickly as possible. I also prefer to make the weighing-weight removable and to provide the corresponding end of the beam 51 with knife-edges 54, on which a testing-weight 55 may be suspended. It will be understood that these testing-weights are for occasional use only and are not employed during the normal operation of the apparatus. The downward movement of the weighted end of the beam 51 is limited by suitable means, such as an adjustable stop-pin 56, and its upward movement may be limited by a similar stop-pin 57.

For suspending the bucket 44 from the scale-beam I have devised a novel arrangement, (shown in detail in Figs. 14 and 15,) according to which the bucket-carrying end of the scale-beam is made double, thus providing two arms 58, to which are secured at their outer ends alined knife-edges 59. A hanger 60, secured at its lower end to the bucket 44, passes upward between the arms 58 and is formed or provided at its upper end with a cross-piece 61, the ends of which project over the corresponding ends of the arms 58 and carry blocks 62, provided on their bottom faces with grooves which receive the knife-edges 59. To prevent any endwise motion of the hanger 60 along the knife-edges 59, a small plate 63 may be secured to the outer end of each of the blocks 62 in position to overlap the adjacent end of the corresponding knife-edge. Each block 62 is located within a recess 64, formed in one end of the cross-piece 61, being mounted therein on a horizontal pivot-pin 65, in order that said blocks may automatically adjust themselves to make contact with both knife-edges 59 throughout their lengths. A broad and stable support for the hanger 60 is thus provided, and in order to prevent the accidental displacement thereof from the arms 58 I secure to each end of the cross-piece 61 a small rod or wire 66, having its lower end 67 so bent that it will extend under the end of the corresponding arm 58 at such a distance therefrom as will prevent the block 62 from being lifted away from said arm far enough to permit the removal of the knife-edge 59 from the groove in which it rests, all possibility of the accidental displacement of the bucket from the scale-beam being thus effectively prevented.

To provide for detaching the bucket from the scale-beam when desired, I prefer to make the ends of the cross-piece 61 thicker than its middle portion and to pivot the wires 66 to the inner faces of these thickened end portions, as by bending the upper ends of said wires into parallelism with their lower ends 67 and inserting them into holes drilled in said end portions, as best shown in Fig. 14, the wires 66 being held in their normal position by means of a catch 68, which is pivoted to the head 61 and arranged to engage said wires and hold them in vertical grooves, in which their upper portions lie, so that they cannot be accidentally turned to withdraw their lower ends 67 from under the arms 58. When it is desired to detach a bucket from its scale-beam, the catch 68 is turned on its pivot, the upper ends of the wires 66 are partially withdrawn from the holes in which they lie, and their lower ends 67 are then turned from under the ends of the arms 58, thereby permitting the hanger 60 to be lifted therefrom.

One of the features of my invention relates to means for stopping the flow of material into a weighing-bucket upon the completion of a load and for starting the flow again after the bucket has discharged its load, and another important feature relates to novel means whereby the successive loads are discharged from the bucket, the result of the concurrent use of these features being that the weighing-bucket at the instant when a load is completed therein is wholly free from and unhampered by any mechanical connections whatsoever with flow-controlling or bucket-dumping mechanism, whereby the sensitiveness of the weighing apparatus proper might be interfered with. Thus for controlling the flow of material from the delivery-chute to the bucket I secure to said bucket a supplementary chute 69, which is inclined at an angle sufficient to cause the material to flow along it and is so arranged that when the bucket is in its highest position ready to receive a load the material flowing through the spout 47 will fall into the bucket; but when the bucket has received the exact amount constituting a full load and thereupon begins to descend its downward movement will immediately carry the chute 69 into such a position that all the material which thereafter flows through said spout 47 will be delivered into the chute 69 instead of into the bucket 44 until the bucket rises again, said material being thence conveyed by said chute through or past the side of the bucket and into a suitable receptacle, such as a fixed trough 70, extending from end to end of the machine past the several buckets and provided with a screw conveyer 71 or equivalent device whereby the material thus delivered into it may be removed and conveyed back to the bin 6 or elsewhere. According to the arrangement shown in the drawings the trough 70 is open at that end toward which the material is forced by the conveyer 71, the material being discharged therefrom into any suitable receptacle. (Not shown.) The conveyer 71 is continuously rotated by means of a wheel 72, secured to one end thereof and driven from the shaft 26, which serves as the main driving-shaft of the machine.

The lower end of each bucket 44 is provided with a movable bottom 73, adapted to be opened and closed, which is preferably hinged thereto at one edge and is normally held closed by means of a spring 74. My preferred arrangement of these parts is illustrated in detail in Figs. 16, 17, and 18, in which the bottom 73 is shown as extended beyond the walls of the bucket, at one side thereof, and provided with two upright arms 75, rigidly secured to these extended portions, said arms 75 being journaled on the ends of a rod 76, secured to the side of the bucket. The spring 74 is coiled around this rod 76 and has its ends made fast, as by hooking them over a rod 77, secured to the support which carries the rod 76, while its central portion is extended and bent under the central portion of the bottom 73, where it is held in a grooved boss 78. In order to insure a tight fit at all points between the bucket and its bottom when the latter is closed, the arms 75 are vertically slotted to receive the ends of the rod 76, as shown in Fig. 16, so that by reason of the play thus provided the spring 74 will act to press the hinged edge as well as the free edge of the bottom 73 against the bucket. To this same end, the spring 74 is caused to engage the center of said bottom, as above described. Each of the arms 75 is provided at its upper end on the same side of the rod 76 as the center of the bucket with an outwardly-projecting pin 79 for a purpose hereinafter set forth.

For opening the bottom 73 after the bucket has been filled I provide a mechanism which is positively operated at regular intervals by its connection with the driving mechanism of the apparatus and is so arranged that if operated after a bucket has been filled and has descended to its lowest position it will engage the pins 79 and force the hinged bottom 73 open against the tension of the spring 74, while if operated when the bucket is empty or only partially filled, and hence is not in the position above referred to, it will not engage said pins 79 at all, the result being that it will be impossible for the contents of the bucket to be discharged except after it has received and is ready to deliver a full load. My preferred form of mechanism for operating the hinged bottom 73 as just described comprises a counterweighted arm 80, supported on the framework of the machine by pivots, as at 81, and forked at that end which is opposite the counterweight, so as to partially embrace the bucket, as shown in Fig. 6. A latch 82 is pivoted at its upper end to the end of each fork of the arm 80 and is provided near its lower end with a notch 83 and prolonged beyond the same to form a downwardly-projecting finger 84, the function of which is to engage the corresponding pin 79 and guide the same into the notch 83 when the bucket 44 is in position to be dumped and the arm 80 is depressed. Each latch 82 is also provided with a small counterweight 85 or equivalent device arranged to throw said latch away from the pin 79 after the bucket has discharged its load and risen to its load-receiving position and the latch 82 has been lifted above said pin 79. For operating the arms 80 at periodic intervals I prefer to employ a shaft 86, journaled in the end portions 2 of the machine and driven from the shaft 26, as hereinafter described, a cam being secured to the shaft 86 directly above each of the arms 80 and arranged to depress the same upon each rotation of said shaft. Each arm 80 is bent upward at or near its forked end, as shown in Fig. 2, so that the pivoted ends of the latches 82, which it carries, are normally higher than the pivots 81, on which it turns. The result of this arrangement is that when the arm 80 is depressed the notches 83 will have a lateral movement toward the corresponding pins 79, and these parts are so proportioned that if the arm 80 is depressed when the bucket 44 is in its highest or load-receiving position the notches 83 will pass below the pins 79 before moving laterally far enough to engage them, while if said bucket is in its lowest or load-discharging position said notches in moving downward to the level of the pins 79 will also move laterally far enough to engage the same and force open the hinged bottom 73. Thus the scale-beam and bucket when the latter is filled are wholly free from and unhampered by any mechanical connection whatever with the bucket-dumping mechanism, and the operation of the latter is made certain at the proper times and impossible at all other times, as previously stated.

Inasmuch as the time required for the bucket 44 to discharge its load may vary, owing to the size of the load or to the nature of the material weighed, it is desirable to provide for holding the arms 80 depressed for any length of time desired, and to this end I have devised a novel form of cam, consisting of two parts 87 and 88, which may be made substantially alike and are located side by side on the shaft 86, one of said parts, as 88, being secured rigidly to said shaft and the other part 87 being loosely journaled thereon and adjustably clamped to the part 88 by means of a thumbscrew 89, passing through a slot 90, formed in said part 87. The parts 87 and 88 are provided, respectively, with cam-faces 91 of similar configuration and arranged side by side, so that by properly adjusting the part 87 with respect to the part 88 the said cam-faces may be made to coincide exactly, thus providing for a downward throw of the shortest duration, or one of the cam-faces may be made to lap past the other, and thus increase their combined operative length to any desired extent not exceeding the combined length of the two cam-faces, in which latter case a downward throw of maximum duration would be given to the arm 80. It will be understood, of course, that both of these cam-faces 91 bear upon the arm 80 or upon the antifriction-roller 92, with which it is provided, so that any portion of either cam-face will be competent to operate said arm 80.

It will be evident that the hinged bottom 73 of the bucket 44 must be closed before said bucket is permitted to rise far enough to carry the upper end of the chute 69 above the stream flowing through the spout 47, since otherwise some material would fall through the bucket without being weighed, and I accomplish this result in a very simple manner with the mechanism above described by giving the spring 74 a tension such that when the bottom 73 is closed it will be held closed by said spring with a force greater than that exerted by the weighing-weight 53 tending to lift the bucket, or, in other words, greater than the weight of a full load of material. The result of so constructing the spring 74 is twofold. In the first place, it renders unnecessary any catch or other locking device for holding the bottom 73 closed, and, in the second place, since when the bucket is in its lowest position and the hinged bottom 73 has been forced open the force of said spring is never less than the bucket-lifting force exerted by the weight 53 and is exerted as much to draw the bucket downward as to draw the bottom 73 up against the bucket. The result is that as the latches 82 are permitted by the cam-face 91 to move upward from the position shown in Fig. 3 the first effect produced by the spring 74 is to close the hinged bottom 73, the bucket 44 being held immovable in its lowest position until this result has been accomplished, whereupon the spring 74 being then incapable of further action the latches 82 in their further upward movement are followed by the bucket 44 until the corresponding movement of the scale-beam is arrested by the stop 56. The latches 82 are then allowed to move upward enough farther to permit them to disengage themselves from the pins 79, and they then remain at rest until the next revolution of the shaft 86 forces the arm 80 down again. I prefer so to form the cam-faces 91 that the upward movement of the arm 80, and consequently that of the bucket 44, will be a gradual one, thus imparting no shock or jar to the scale-beam or knife-edges and reducing the wear of those parts.

In weighing substances like baking-powder, which tend to adhere to any surface with which they come in contact, it is important to dislodge such adhering portions from the walls of the weighing-bucket when a load is discharged therefrom in order that the load may not be made inaccurate by the withholding of said portions therefrom or by the addition thereto of similar portions of a previous load, and to this end I provide a device for automatically rapping or jarring each bucket 44 when in its discharging position. This device preferably consists of a spring-actuated lever 93, journaled on the framework of the machine and provided at one end with a hammer 94, adapted to strike against an anvil 95, secured to the bucket 44, when said bucket is in its lowest position. The blow of the hammer 94 is delivered by tripping the lever 93 by means such as a cam 96, which may be conveniently secured to the shaft 86 and is so arranged with respect to the cams which operate the arm 80 that said lever will be tripped just before the hinged bottom 73 of the bucket 44 is permitted to close. This arrangement for freeing the weighing-bucket from adhering portions of the substance weighed is substantially the same as that shown and described in my prior patent, No. 667,560, granted February 5, 1901, being broadly claimed therein.

In order to guide the bucket 44 in its movements and to steady it while undergoing the operation of the bucket-dumping and bucket-rapping mechanisms, a link 97 may be pivoted at one end to the side of the bucket near its bottom and at the other end to the framework of the machine, as shown in Figs. 2 and 3, and in order to relieve the scale-beam 51 from strains and shocks which might otherwise be imparted to it by the operations of said dumping and rapping mechanisms I prefer to provide each bucket with a support 98, adjustably secured to the framework of the machine and having its lower end located under the center of the cross-piece 61 at the top of the hanger 60 in such position that when the bucket descends said cross-piece will rest upon the support 98 simultaneously with or just before the engagement of the beam 51 with the stop 57, the weight of the bucket and its contents being thus supported independently of the beam during the operations above referred to. The accidental displacement of the knife-edges 52 from their supporting-blocks may be prevented by means of a rod 99, extending from end to end of the machine directly above the centers of the beams 51 and eccentrically journaled at its ends in the end portions 2 of the framework, so that by turning said rod it may be brought close enough to the top of the beams to prevent said knife-edges from being lifted out of the grooves in which they rest without interfering with the tilting of the beam. The rod 99 is then secured in this position in any suitable manner, as by means of a washer 100, (see Fig. 1,) clamped against one of the end portions 2 by a screw passing through said washer into the end of said rod.

Materials of the kind which the machine herein described is particularly intended to weigh ordinarily have to be settled or shaken down in the receptacles into which the loads are delivered, and therefore instead of permitting the weighing-buckets to discharge directly into the receptacles it is desirable to cause them to discharge into funnel-like chutes, which during the filling operation are tightly fitted at their lower ends to the tops of the receptacles, respectively, and serve to hold any excess of material until said receptacles have been sufficiently agitated to settle their contents and enable them to take in full weights. An arrangement for this purpose is shown and described in my Letters Patent above referred to, in which a rotating table brings a series of funnels under the weighing mechanism successively. According to my present invention a funnel 101 is permanently located under each weighing-bucket and preferably has its sides inclined at a suitable angle, since powdery materials are less likely to stick, clog, or blow when sliding down an inclined surface than when falling directly through a vertical passage. Each funnel 101 is supported on the forked end of a lever 102, which is pivotally supported, as at 103, on the framework of the machine and is operated to raise and lower the funnel a short distance by means, such as a cam 104, secured to a shaft 105 and bearing against the free end of the lever 102, which is preferably provided with an antifriction-roller 106. The shaft 105 is driven continuously by means such as hereinafter described, and in order that the period during which the funnel is lowered may be varied to correspond with the period of load discharge from the bucket I prefer to construct the cams 104 like the cams which operate the arms 80, thus obtaining a similar adjustment in the operation of the lever 102. The purpose of providing for an upward movement of the funnels 101 is to enable them to be lowered upon the top of a receptacle while a load of material is being discharged into it, a series of receptacles being brought under the funnel successively and temporarily held there, as hereinafter described, and in order to obtain a tight fit between the bottom of the funnel and the top of each receptacle I provide the lower end of said funnel with a closely-fitting ring 107, having a laterally-extending flange 108 near its lower end, the bottom of said flange being covered with a ring or washer 109, of felt or similar semi-elastic material, which is adapted to rest upon the top edge of a receptacle when the funnel is lowered and to make a tight joint therewith. The lower end of the ring 107 should project slightly below the felt ring 109, so that it may enter the top of the receptacle and keep the same centered with respect to the bottom of the funnel. A number of rings 107 with bottom portions of different size are provided to correspond with receptacles of different diameters and are made detachable from the funnels 101, preferably by cutting a number of vertical slits in the upper portion of each ring which extends through its top edge, and thus form flexible fingers 110, which are clamped against the walls of the funnel by suitable means, such as a jointed ring 111, the ends of which are drawn together by a thumb-screw 112. In order to provide for the escape of the air contained within each receptacle without causing it to pass through the mass of descending material, and thus to blow and scatter the same, the funnels 101 may be provided, respectively, with a partition 113, which is shown in detail in Fig. 24 and is secured to its funnel by means of a hook 114, attached to its upper end. This partition 113 is provided near its upper end with notches 115, through which the air escapes from one side of the partition as the material descends past its other side.

I will now describe those portions of my invention which relate to the feeding of empty receptacles to the weighing and load-delivering mechanism, to the settling of successive loads of material delivered therefrom, and to the removal of the filled receptacles from the machine.

It will be noticed that each set of mechanisms for feeding, weighing, and delivering the successive loads, although constructed exactly like every other set, is nevertheless wholly independent of the other sets as to the time when its various operations take place, for the reason that the latter depend only upon the position of the various cams upon the shafts 32, 86, and 105, and hence by properly adjusting these cams the several sets of mechanisms may be made to operate one after the other in regular order, so that I am able to cause the machine to deliver a continuous series of filled receptacles and at the same time to give each load ample time to be shaken down in the receptacle to which it is delivered while the other weighing and delivering mechanisms are in various stages of their operation and before another load is discharged from the particular mechanism which has filled the said receptacle. In order, however, to make this arrangement fully operative, it is desirable that the mechanism for supplying empty receptacles and removing filled ones shall be made as independent of the various sets of weighing and delivering mechanisms as the latter are of each other, to the end that whenever any one of said sets is ready to receive an empty receptacle the latter may be promptly supplied thereto and whenever a filled receptacle is ready to be removed such removal will be effected immediately. To accomplish these results, I have devised what may be called a "feeding-table," which is located horizontally under the series of delivery-funnels 101 and is stationary as a whole, although composed of parts which are in constant motion, the result being that the table is always present to support a receptacle while being filled and at the same time is always in motion, ready to bring up empty receptacles as fast as necessary and to remove the filled ones. My feeding-table is composed, according to the construction shown, of a series of horizontal parallel rods 116, which are rotated continuously in the same direction and extend from end to end of the machine, being spaced apart sufficiently to permit any material which may be spilled thereon to fall between them into a tray or box (not shown) placed under the machine and at the same time being sufficiently near each other to form a stable support for the receptacles. These rods 116 are supported and rotated, preferably, by causing their ends to rest upon the horizontal top surfaces of two endless belts 117, located, respectively, at the ends of the machine outside of the base 3 and each passed around drums 118 and 119. The two drums 118 are secured to a common shaft 120, and the two drums 119 are secured to a parallel shaft 121, these shafts being continuously driven, as hereinafter described. The rods 116 are held against endwise movement and kept at proper distances from one another preferably by turning a groove 122 in each rod 116 adjacent to the inner edges of the belts 117 and locating said grooves in a corresponding series of notches 123, formed in the upper edges of two horizontal strips 124, secured to the base 3, one at each end thereof. This arrangement permits the rods 116 to be brought as close together as may be desired. The rods 116, taken collectively, thus form a feeding-table adapted to carry a receptacle from one side of the machine to the other whenever such receptacle is free to move, and for the purpose of bringing up empty receptacles to one side of the feeding-table and removing the filled receptacles from the other side thereof two conveying belts or aprons 125 and 126 may be employed, which pass, respectively, around drums 127, journaled near the sides of the table and extend therefrom to any convenient points, where they are driven in the usual manner. In order to bring said aprons close to the edges of the feeding-table, I have devised an arrangement (best shown in Figs. 4 and 21) according to which two rollers 128 and 129 are located between each drum 127 and the corresponding edge of the feeding-table parallel with the same, said rollers 128 and 129 being journaled at their ends in slots 130, formed in fixed supports 131, which are so located that the ends of the axes of said rollers will lie substantially in a straight line leading from the axes of the corresponding drum 127 to that of the end rod 116 at the adjacent edge of the feeding-table. The inner roller 128 rests against the surface of the drum, and the outer roller 129 rests in like manner against the surface of the roller 128, the latter roller being located just far enough from the corresponding end rod 116 to permit the conveying-apron 125 or 126 to pass between it and said rod. The conveying-aprons pass from the top of the drums 127 around the outer rollers 129 and thence under said drums and back to their respective driving mechanisms and are thus brought so close to the feeding-table that the horizontal surface along which the receptacles travel is made practically continuous. Each roller 128 is driven in the opposite direction to its drum 127 by frictional contact therewith, and the rollers 129 are driven by frictional contact with the rollers 128, so that the latter rollers will rotate in the same direction with the drums 127 and at the same surface velocity, thus assisting in the propulsion of the conveying-aprons.

A sufficient number of empty receptacles to keep the machine supplied are placed upon the apron 125 by an attendant and are guided along said apron and into position under the respective funnels 101 by suitable means, such as parallel rods 132, which are arranged in pairs and extend from a point beneath the weighing and delivering mechanisms along the apron 125 as far as may be desired. These rods 132 are suspended from the framework of the machine in such manner as to be laterally adjustable, so as to provide guideways corresponding in width to the diameter of the various receptacles which may be employed from time to time and are preferably made in detachable sections by being provided with vertically-notched ends 133, adapted to embrace the longitudinal grooved lower ends of hangers 134. The upper ends of the hangers 134 are notched, as shown at 135 in Fig. 2, to receive rods 136, extending from end to end of the machine, and are clamped to these rods by means of screws 137 in any desired position of adjustment.

For arresting the successive receptacles in proper position under the funnels 101 I provide in connection with each of said funnels an automatic arrangement which permits only one receptacle at a time to pass under the corresponding funnel, arrests the successive receptacles and centers them with respect to said funnel, and releases them when filled. My mechanism for this purpose, as preferably constructed, comprises a number of plates 138, one for each weighing and delivering mechanism, said plates being located just above the feeding-table and each plate being pivoted at one edge to one of the rods 132. Each plate 138 is provided with a V-shaped notch 139, which is wide enough to receive a receptacle and is so located with respect to the corresponding funnel 101 that if said plate is turned from a vertical into a horizontal position, as shown in Fig. 6, any receptacle which happens to be caught between the sides of the notch 139 will be automatically centered between said sides and the opposite rod 132 and will thus be held in such position that when the corresponding funnel 101 is lowered it will automatically fit itself to the top of the receptacle and make a tight joint therewith, as previously described. It will be understood that receptacles of different size will require plates having notches 139 of corresponding size, and the rods 132, to which said plates are pivoted, are therefore made detachable, as previously stated, in order to permit the substitution of plates with notches of proper size when desired. In order to prevent the empty receptacles from tipping when engaged by the notched plate 138 as just described, a vertical plate 140, bent to correspond with the outline of the notch 139, may be secured to the top of the plate 138, thus providing a wide surface to bear against the receptacles, and a similar wide surface for the other side of the receptacles may be provided by means of a horizontal rod 141 having its ends bent downward and inserted in the top of the corresponding rod 132.

Since the feeding-table tends to keep the receptacles in constant motion, it is desirable to prevent the empty receptacles from crowding against that receptacle which is being filled at any given instant, and to this end I prefer to extend each plate 138 toward the conveying-apron 125 and to provide it with another notch 142 and a vertical plate 143, similar to the notch 139 and plate 140 previously described, and operating to keep that receptacle which immediately follows the one being filled at a proper distance therefrom. These notches 142 and 139 are located at such a distance from each other that a receptacle will be carried from the former to the latter notch by the action of the feeding-table during the interval which occurs between the raising and lowering of the plate 138, when a filled receptacle is released thereby.

It will be evident that the raising and lowering of each plate 138 should occur simultaneously with the raising and lowering of the corresponding funnel 101, so that whenever said funnel is raised after the filling of a receptacle the latter will immediately be removed from under it and when the funnel is lowered again there will always be a receptacle under it ready to be filled, and I therefore prefer to operate said plate 138 by connecting it by a link 144 with the free end of a lever 145, which is pivoted at its opposite end to the framework of the machine, as at 146, and is also pivotally connected between its ends with one side of the funnel 101, as at 147. Thus whenever the funnel is raised it will elevate at the same time the free end of the lever 145, and thereby lift the plate 138 into a vertical position, and when said funnel is lowered again said plate will simultaneously fall into a horizontal position, and in so doing will automatically center an empty receptacle beneath said funnel, as above described. The lever 145, in connection with an arm 148, pivoted on the same axis and pivotally connected with the opposite side of the funnel, as at 149, serves to guide and steady the upper end of said funnel, and in Fig. 6 this lever 145 and arm 148 are shown as provided, respectively, with integral hubs 150 and 151, of which the end of one is journaled in the hollow end of the other, so that they may turn independently of each other, and around each of these hubs is coiled a spring 152, which acts to force the funnel 101 downward and hold it firmly against the top of a receptacle, this being desirable in order that when said receptacle is rapped or jarred to settle the material therein the funnel may not be dislodged from the top of the receptacle by such action.

That portion of my invention which relates to agitating the receptacles while being filled for the purpose of settling the loads of material therein is preferably constructed as follows: In place of the cylindrical rod 116, which would otherwise lie under the center of the receptacles while being filled, I provide a rod 153, which is rotated independently of the rods 116 and is located at a slightly higher level than the same, so that each receptacle while being filled will be supported by said rod 153, and this rod is so formed that when rotated it will impart a rapid series of blows or shocks to said receptacle. To this end said rod is preferably made polygonal and is rotated at a considerably greater speed than the rods 116, the receptacles being thereby jarred in an obvious manner. The rod 153 is driven continuously, as hereinafter described, and is preferably journaled at each end in a bearing 154, pivotally mounted at its ends in a U-shaped support 155, which is itself supported on a pin 156, adjustably held in a vertical socket, thus providing a self-alining adjustable bearing. By rotating the polygonal rod 153 at a greater speed than the rods 116 I not only increase the rapidity of the settling action, but I also hasten the removal of the filled receptacles from beneath the funnels 101, because as soon as a receptacle is released the fact that it rests upon and is supported by the rod 153 will result in its being started on its forward movement at a more rapid rate than that of the receptacles in their normal movement across the feeding-table, thus insuring the withdrawal of the filled receptacles beyond reach of the action of the plates 138 when again lowered. This result is particularly desirable when square packages are being handled. It will be evident that the polygonal rod 153 might be replaced by a rotating rod of any other shape adapted to vibrate a receptacle resting upon it, so far as the settling of the material is concerned.

In Figs. 1 and 7 I have shown connections whereby the various moving parts of my apparatus may be driven simultaneously from a single shaft, in this case the shaft 26. According to the arrangement shown the shafts 32, 86, 105, 120, and 121 are provided, respectively, with sprocket-wheels 157, 158, 159, 160, and 161, around which a continuous sprocket-chain 162 is passed, as shown in Fig. 7, the simultaneous rotation of all of said shafts being thus provided for. At the other end of the machine the conveyer 71 and the polygonal rod 153 are belted directly to the shaft 26, and a belt-pulley 163, driven from the shaft 26, is loosely mounted on the shaft 86 and carries a sprocket-wheel 164, which drives the shaft 121, through intermediate sprocket-wheels 165 and 166, connected, respectively, with said wheel 164 and with a sprocket-wheel 167 on said shaft by sprocket-chains 168 and 169. These various sprocket-chains may be kept tight by suitable tightening devices of the usual construction, such as shown at 170 and 171 in Figs. 1 and 7, and the endless belts 117 may also be kept tight by belt-tighteners 172.

The operation of the apparatus above described, as to the individual mechanisms, will not require further description. The various shafts are rotated at speeds suited to the functions of the parts which they carry or operate, and said parts are adjusted to operate at the proper times and preferably in such manner that no two of the weighing and delivering mechanisms will at any given instant be in the same stage of operation, to the end that the filled receptacles may be delivered from the apparatus in a regular series instead of in groups, as previously stated. When a weighing-bucket has been filled and has descended to its lowest position, it simply waits in such position until it is dumped by the operation of its arm 80, and in case the arm 80 operates before the bucket has descended the only result will be that a receptacle may be passed through the machine without being filled at all. In case a weighing-bucket should be dumped in the absence of any receptacle beneath its funnel 101 that particular load would fall through the feeding-table out of the way and could not possibly affect any other load. It may be taken as axiomatic in weighing powdery materials automatically that the stream of material which is fed to the weighing-bucket should not be wholly cut off and that the material should always slide down inclined surfaces rather than fall through vertical passages. These principles are observed in my apparatus and have much to do with its accuracy and speed. It is to be understood, however, that my apparatus is well adapted for weighing other materials than those referred to and that many of its various parts although particularly adapted and intended to be used in combination with one another are nevertheless capable of being employed in other combinations than those herein described. The several features of my apparatus may also be variously modified in many particulars without departing from my invention, and I do not consider my invention to be limited to the use of a number of similar weighing mechanisms, as each set of mechanisms forms in itself a complete weighing and package-filling machine. By properly adjusting the apparatus the different weighing mechanisms may be made to deliver different weights of material, so that packages of different capacity may be filled at the same time. It will be evident, also, that my apparatus may be made to weigh different substances at the same time by providing the bin 6 with partitions separating it into compartments.

I claim as my invention—

1. In an automatic weighing apparatus, the combination with a weighing mechanism of a bin provided with main-stream and drip-stream discharge-openings delivering directly to the weighing mechanism, said drip-stream openings being constantly open, a cut-off controlling the main-stream openings, and means for actuating said cut-off.

2. In an automatic weighing apparatus, the combination of a bin provided at its bottom with a circular series of perforations and with one or more apertures located inside of said series of perforations, a ring-shaped cut-off mounted to oscillate concentrically with said series of perforations and perforated to register with the same, the central portion of said cut-off being open, and means for oscillating said cut-off.

3. In an automatic weighing apparatus, the combination of a bin provided at its bottom with a circular series of perforations and with a delivery-opening inside of said series and separated therefrom by a hollow hub, a stirring device located above said perforations and means for operating the same, an oscillating cut-off journaled on said hub and provided with a series of perforations adapted to register with those in the bottom of the bin, and means for actuating said cut-off.

4. In an automatic weighing apparatus, the combination of a bin having its bottom provided with a circular series of perforations and with a circular slit inside the same and separated therefrom by a hollow hub, a spider journaled concentrically with said hub and provided with arms extending over said perforations, and also provided with one or more pins projecting into the said slit, means for operating said spider, an oscillating ring-shaped cut-off journaled on said hub and provided with a series of openings adapted to register with those in the bottom of the bin, and means for oscillating said cut-off.

5. In an automatic weighing apparatus, the combination of a bin having its bottom provided with a circular series of discharge-openings and with a slot 24 located within said series, and a spider journaled to rotate on the bottom of the bin above said openings, said slot being covered by the central portion of the spider.

6. In an automatic weighing apparatus, the combination with a cut-off, of means for actuating the same, comprising a rotatable shaft, a cam secured thereto and having two relatively adjustable collars each provided with a cam-face, the cam-faces on said collars extending laterally in opposite directions, and an arm connected to said cut-off and arranged to be operated by said cam-faces.

7. In an automatic weighing apparatus, the combination of a supply-bin provided with a discharge-opening, a cut-off arranged to open and close the same, and means for actuating said cut-off comprising a rotatable shaft, a cam secured thereto and having two collars each provided with a laterally-extending cam-face, one of said collars being adjustable circumferentially on said shaft, and an arm connected to said cut-off and arranged to be operated by said cam-faces.

8. In an automatic weighing apparatus, the combination with a supply-bin of a feeding device and means for actuating the same continuously, a friction-clutch normally connecting said actuating means and feeding device, means for clamping the members of said clutch together, and means for automatically operating said clamping means to unclamp said members upon the arresting of the movement of the feeding device.

9. In an automatic weighing apparatus, the combination of a supply-bin provided with a number of discharge-openings, a corresponding number of feeding devices coöperating with said openings respectively, continuously-driven mechanism for operating said feeding devices simultaneously, and means for automatically disengaging said mechanism from either feeding device in case the movement of the latter is obstructed.

10. In an automatic weighing apparatus, the combination of a supply-bin provided with a discharge-opening and a feeding device coöperating with said opening, a shaft arranged to operate said feeding device and provided with a friction-clutch, means for continuously rotating one member of said clutch, and a bolt passing through the driving member of the clutch and threaded axially into the driven member, and normally holding the parts of the clutch together, the threads of said bolt being so cut that its rotation with the driving member of the clutch while the driven member is at rest will unscrew said bolt and thereby diminish the pressure between said clutch members.

11. In an automatic weighing apparatus, the combination of a supply-bin provided with a discharge-opening, a shaft provided with a feeding device coöperating with the discharge-opening, a friction-clutch carried by said shaft, a driving-shaft extending transversely with respect to the first-named shaft and located at one side of the same, and driving connections between the driving-shaft and one member of said friction-clutch consisting of a pair of intermeshing spiral gears.

12. In an automatic weighing apparatus, the combination of a supply-bin provided with a number of discharge-openings, a corresponding series of shafts each provided with a feeding device coöperating with one of said discharge-openings, a driving-shaft extending transversely with respect to said feeding-shafts, means for rotating the same, and driving connections between the latter shaft and the feeding-shafts consisting of pairs of intermeshing spiral gears, the gears on the driving-shaft being arranged in pairs having their respective teeth oppositely inclined.

13. In an automatic weighing apparatus, the combination with a scale-beam of a weighing-bucket suspended therefrom, means for delivering a stream of material to said bucket, and a chute or spout secured in fixed relation to said bucket in position to intercept such stream of material on the descent of the bucket and thereby to divert said stream therefrom.

14. In an automatic weighing apparatus, the combination of a weighing-bucket, a supply-chute arranged to deliver material thereto, and a supplementary inclined chute or spout secured to said bucket and extending past the wall thereof, the upper end of said latter chute being so located as to pass above the path of the stream of material delivered to the bucket when the latter rises, and to receive said stream of material and divert it from the bucket when said bucket descends.

15. In an automatic weighing apparatus, the combination of a weighing-bucket provided with a discharge-door or closer, means normally holding said door closed, and door-opening means normally disconnected from said door and arranged to engage the same only after the bucket has descended, said door-opening means being positively actuated independently of the position of the bucket.

16. In an automatic weighing apparatus, the combination of a scale-beam, a weighing-bucket supported by said beam and provided with a discharge-door or closer, means for limiting the downward movement of the bucket, a spring normally holding said door closed and having a normal tension greater than the weight of a full load of material in said bucket, and downwardly-operating means for opening said door against the tension of said spring.

17. In an automatic weighing apparatus, the combination of a scale-beam, a weighing-bucket supported by said beam and provided with a discharge-door or closer, means for limiting the downward movement of the bucket, means normally holding said door closed with a force greater than the weight of a full load of material, an arm provided with means arranged to engage said door when the bucket is in its load-discharging position only, and means for operating said arm.

18. In an automatic weighing apparatus, the combination of a scale-beam, a weighing-bucket supported by said beam and provided with a discharge-door or closer, means for limiting the downward movement of the bucket, means normally holding said door closed with a force greater than the weight of a full load of material, an arm and means for oscillating the same in a vertical plane, and a latch carried by said arm and arranged to engage said door when the bucket is in its load-discharging position and to remain in engagement with said door while the latter is opening and closing and also while the bucket is rising to the load-receiving position.

19. In an automatic weighing apparatus, the combination of a scale-beam, a weighing-bucket supported by said beam and provided with a discharge-door or closer having a laterally-extending pin secured thereto, means for limiting the downward movement of the bucket, means normally holding said door closed with a force which is greater than the weight of a full load of material, a pivoted arm and means for oscillating the same in a vertical plane, and a latch pivotally suspended from said arm at a point which is higher than the pivot on which said arm turns, and provided near its lower end with a notch adapted to engage said pin when the bucket is in the load-discharging position, and normally located above and to one side of said pin when the bucket is in the load-receiving position.

20. In an automatic weighing apparatus, the combination with a scale-beam and stops for limiting the movements of the same, of a weighing-bucket supported by said beam and provided with a discharge-door or closer having a laterally-extending pin secured thereto, means normally holding said door closed with a force which is greater than the weight of a full load of material, a pivoted arm, a latch pivotally suspended from said arm at a point which is higher than the pivot on which said arm turns, and provided near its lower end with a notch arranged to engage said pin when the bucket is in the load-discharging position, and normally located above and to one side of said pin when the bucket is in its load-receiving position, a continuously-driven shaft, and a cam secured to said shaft and arranged to operate said arm.

21. In an automatic weighing apparatus, the combination with a scale-beam and stops for limiting the movements of the same, of a weighing-bucket carried by said beam and provided with a discharge-door or closer, means normally holding said door closed with a force which is greater than the weight of a full load of material, an arm provided with means for engaging said door when the bucket is in its load-discharging position only, means for operating said arm, and means for rapping the bucket while said door is open.

22. In an automatic weighing apparatus, the combination of a weighing-bucket provided with a discharge-door or closer, means normally holding said door closed, an arm provided with means for engaging said door when the bucket is in its lowered position only, and means for oscillating said arm periodically, independently of the position of said bucket.

23. In an automatic weighing apparatus, the combination of a weighing-bucket, a supply-chute arranged to deliver material thereto, a supplementary inclined chute or spout secured to said bucket and extending past the wall thereof, the upper end of said latter chute being so located as to pass above the stream of material delivered to the bucket when the latter rises and to receive said stream of material and divert it from the bucket when said bucket descends, a door or closer carried by said bucket and means normally holding the same closed with a force which is greater than the weight of a full load of material, and means for opening said door when the bucket is in its load-discharging position only.

24. In an apparatus of the character described, the combination with a weighing-bucket provided with pivots, of a door or closer slotted to receive said pivots and arranged to open by turning on the same, and a spring engaging said door at its center and normally holding the same closed against said bucket.

25. In an apparatus of the character described, the combination with a weighing-bucket provided with pivots, of a door or closer slotted to receive said pivots and arranged to open by turning on the same, and a spring engaging said door at its center and normally holding the same closed against said bucket, the tension of said spring being always greater than the weight of a full load of material.

26. In an apparatus of the character described, the combination of a series of weighing-buckets and a corresponding series of supply-chutes arranged to deliver material to said buckets respectively, a supplementary inclined chute or spout secured to each of said buckets and extending past the wall thereof, and having its upper end so located as to pass above the path of the stream of material delivered to the bucket when the latter rises, and to receive said stream of material and divert it from the bucket when said bucket descends, and a conveying-trough located in position to receive material from each of said supplementary chutes.

27. In an apparatus of the character described, the combination of a scale-beam having at one end two arms carrying alined knife-edges, a hanger extending downwardly between said arms and provided with self-alining blocks adapted to rest upon said knife-edges, and a bucket secured to said hanger and located beneath the scale-beam.

28. In an apparatus of the character described, the combination of a scale-beam having at one end two arms carrying alined knife-edges, a hanger extending downward between said arms and provided with self-alining blocks grooved to receive said knife-edges, stop-plates secured to the outer ends of said blocks and overlapping said knife-edges, and a bucket secured to said hanger and located beneath the scale-beam.

29. In an apparatus of the character described, the combination of a scale-beam provided with a knife-edge, a hanger supported on said knife-edge, and extending downwardly therefrom, a bucket secured to said hanger, and located beneath the scale-beam and means for preventing the displacement of said hanger from the knife-edge, comprising a U-shaped rod journaled at one end in said hanger and having its other end normally located beneath the scale-beam, substantially as described.

30. In an apparatus of the character described, the combination of a scale-beam having at one end two arms each of which carries a knife-edge on its upper surface, a hanger supported on said knife-edges, a bucket secured to said hanger, and means for preventing the displacement of said hanger from said knife-edges, comprising two U-shaped rods each journaled at its upper end in the hanger and having its other end normally located beneath one of said arms, and a pivoted catch adapted to engage said rods simultaneously and lock the same in their operative position, substantially as described.

31. In an automatic weighing apparatus, the combination with a scale-beam and a weighing-bucket in continuous suspensional relation therewith, of means for supporting the bucket independently of the scale-beam when said bucket is in its load-discharging position.

32. In an automatic weighing apparatus, the combination of a scale-beam, a weighing-bucket supported thereon and provided with a discharge-door, means normally holding said door closed with a force greater than the weight of a full load of material, downwardly-acting means for positively opening said door, and means for supporting said bucket independently of the scale-beam during the opening of said door.

33. In an apparatus of the character described, the combination with a scale-beam and a weighing-bucket carried thereby, of a delivery-funnel arranged to receive material discharged from said bucket, means for supporting said funnel and raising and lowering the same, and a detachable and adjustable mouthpiece secured to the lower end of said funnel and adapted to fit the top of a receptacle.

34. In an apparatus of the character described, the combination with a delivery-funnel having a cylindrical lower end, of a detachable mouthpiece adapted to fit the top of a receptacle and slitted at its upper end to provide flexible fingers adapted to surround the lower end of said funnel, and means for clamping the fingers against the funnel.

35. In an apparatus of the character described, the combination with a weighing mechanism of a feeding-table comprising a series of parallel rods, means for simultaneously rotating said rods in the same direction, and means for arresting a receptacle on said table in position to receive a load discharged from said weighing mechanism.

36. In an apparatus of the character described, the combination with a weighing mechanism of a feeding-table comprising a series of parallel rods spaced apart and held against lateral movement, means for simultaneously rotating said rods in the same direction, and means for arresting a receptacle on said table in position to receive a load discharged from said weighing mechanism.

37. In an apparatus of the character described, the combination of two parallel belts spaced apart, means for driving the same in the same direction, and a series of rotatable rods supported on said belts and held against lateral movement, thereby forming a feeding-table.

38. In an apparatus of the character described, the combination of an open, horizontal frame, belt-wheels journaled thereon, endless belts carried by said wheels and means for rotating the latter continuously in the same direction, and a series of rotatable rods spaced apart and held against lateral movement, said rods being supported at their ends on said belts.

39. In an apparatus of the character described, the combination of a polygonal rod adapted to support a receptacle, means for rotating the rod, means for holding a receptacle on said rod, and means for delivering a load of material to said receptacle.

40. In an apparatus of the character described, the combination of a series of rods spaced apart and held against lateral movement, means for simultaneously rotating said rods in the same direction, one of said rods being rotated at a greater surface velocity than the adjacent rods, and means for holding a receptacle upon the faster rod while being filled.

41. In an apparatus of the character described, the combination of a series of horizontal rods spaced apart and held against lateral movement, means for simultaneously rotating said rods in the same direction, thereby forming a feeding-table, one of said rods being polygonal and having its upper surface slightly higher than the top surface of the other rods, and said polygonal rod being rotated more rapidly than the other rods but in the same direction, and means for holding a receptacle on said polygonal rod while being filled.

42. In an apparatus of the character described, the combination with a series of weighing and delivering mechanisms of a feeding-table adapted to present receptacles to each of said mechanisms, and comprising a series of horizontal rods and means for simultaneously rotating said rods in the same direction.

43. In an apparatus of the character described, the combination with a feeding-table composed of a series of horizontal rods and means for simultaneously rotating said rods in the same direction, of a conveyer-belt forming a continuation of said feeding-table, and means for driving said belt in the same direction as that in which a receptacle is fed by said table.

44. In an apparatus of the character described, the combination with a feeding-table composed of a series of horizontal rods and means for simultaneously rotating said rods in the same direction, of a drum journaled to rotate adjacent to one of the end rods of said table and parallel therewith, two parallel rollers extending from said drum to a point near said end rod and arranged to be driven by frictional engagement with each other and with said drum, a conveying-belt passing over that roller which is nearest said end rod, and means for driving said belt.

45. In an apparatus of the character described, the combination with a feeding-table composed of a series of horizontal rods and means for simultaneously rotating the same in the same direction, of an apparatus adapted to deliver loads of material successively, guides located above said feeding-table, and a stop coöperating with said guides and adapted to arrest successive receptacles when in proper position with respect to said delivering mechanism.

46. In an apparatus of the character described, the combination with means for delivering successive loads of material, of a feeding-table, guides located above the same, a stop for holding successive receptacles beneath said delivering mechanism, comprising a movable plate provided with a notch adapted to receive and center a receptacle, and means for operating said plate.

47. In an apparatus of the character described, the combination with means for delivering successive loads of material, of a feeding-table located beneath the same, receptacle-guides located above said table, a stop for said receptacles comprising a movable plate provided with two notches each adapted to receive a receptacle, and means for operating said plate.

48. In an automatic weighing apparatus, the combination with means for delivering successive loads of material and a feeding-table located beneath the same, of detachable, laterally-adjustable guides supported above said table, a normally horizontal plate pivoted to one of said guides and provided with a notch adapted to receive and center a receptacle beneath said delivering means, and means for tilting and restoring said plate after a receptacle has been filled.

49. In an apparatus of the character described, the combination with means for delivering successive loads of material and a feeding-table located beneath the same, of laterally-adjustable hangers supported above said table, sectional, horizontal guides detachably connected to the lower ends of said hangers, a stop carried by one of said guides, and means for operating said stop.

50. In an apparatus of the character described, the combination of a delivery-funnel, pivoted arms supporting the same and means for oscillating one of said arms in a vertical plane, a feeding-table located beneath said funnel, guides located above said table, a stop comprising a plate pivoted at one edge to one of said guides and provided with a notch adapted to receive and center a receptacle beneath said funnel, and a link connecting the free edge of said plate with one of the arms supporting said funnel.

51. In an apparatus of the character described, the combination of a series of independent scale-beams each carrying a weighing-bucket, means for delivering material to each of said buckets independently of the others, means for dumping each bucket after it has descended, said latter means being arranged to operate on said buckets successively, and a continuously-operated receptacle-feeding table which is common to all of said weighing mechanisms.

52. In an apparatus of the character described, the combination of a series of independent scale-beams each carrying a weighing-bucket, means for delivering material to each of said buckets independently of the others, means for dumping each bucket after it has descended, said means being arranged to operate on said buckets successively, a series of delivery-funnels each adapted to transmit material from one of said buckets to a receptacle, a continuously-operated feeding-table which is common to all of said weighing and delivering mechanisms, and means for settling the material in the receptacles while held on said feeding-table beneath the corresponding delivery-funnels.

53. In an automatic weighing apparatus, the combination of a bin provided at its bottom with a circular series of perforations forming main-stream-discharge openings and also with distinct drip-stream-discharge openings, the latter being constantly open, a ring-shaped cut-off mounted to oscillate concentrically with said series of perforations and perforated to register with the same, and means for oscillating said cut-off.

54. In an automatic weighing apparatus, the combination of a bin provided with main and drip stream discharge openings, the latter being constantly open, a cut-off controlling the main-stream-discharge openings, and a continuously-operated feeding device coöperating with said discharge-openings.

55. In an automatic weighing apparatus, the combination of a bin provided at its bottom with a circular series of perforations forming main-stream-discharge openings and also with distinct drip-stream-discharge openings, the latter being constantly open, a ring-shaped cut-off mounted to oscillate concentrically with said series of perforations and perforated to register with the same, means for oscillating said cut-off, a rotatable feeding device located above said openings, and means for operating the same continuously.

56. In an automatic weighing apparatus, a weighing-bucket having a discharge-door or closer arranged to support a load of material contained in said bucket, and a spring normally holding said door closed in opposition to the pressure exerted by said load.

57. In an automatic weighing apparatus, the combination with a scale-beam of a bucket provided with a hanger normally suspended on said beam, and a stop located in the path of movement of said hanger as the bucket descends and arranged to engage and support the same when the bucket is in its load-discharging position.

58. In an automatic weighing apparatus, the combination with a scale-beam of a bucket provided with a hanger normally suspended on said beam, a stop arranged to engage said hanger on the downward movement of the bucket and thereby support said bucket independently of the scale-beam when in the load-discharging position, a discharge-door or closer for said bucket, means normally holding the same closed with a force greater than the weight of a full load of material, and means for forcibly opening said closer.

59. In an automatic weighing apparatus, the combination of a scale-beam and a bucket suspended thereon, a stop arranged to limit the downward movement of the bucket independently of the scale-beam, and stops arranged to limit the movement of the scale-beam itself.

60. In an automatic weighing apparatus, the combination of a scale-beam carrying weights at one end, a bucket having a hanger suspended on the opposite end of said beam, stops arranged to limit the movements of the weighted end of said beam, and a stop arranged to engage and support the bucket-hanger when the bucket is in the load-discharging position.

In testimony whereof I have hereunto subscribed my name this 9th day of June, 1902.

WILLIAM EMERY NICKERSON.

Witnesses:
    E. D. CHADWICK,
    JOSEPH T. BRENNAN.